United States Patent Office 3,034,836
Patented May 15, 1962

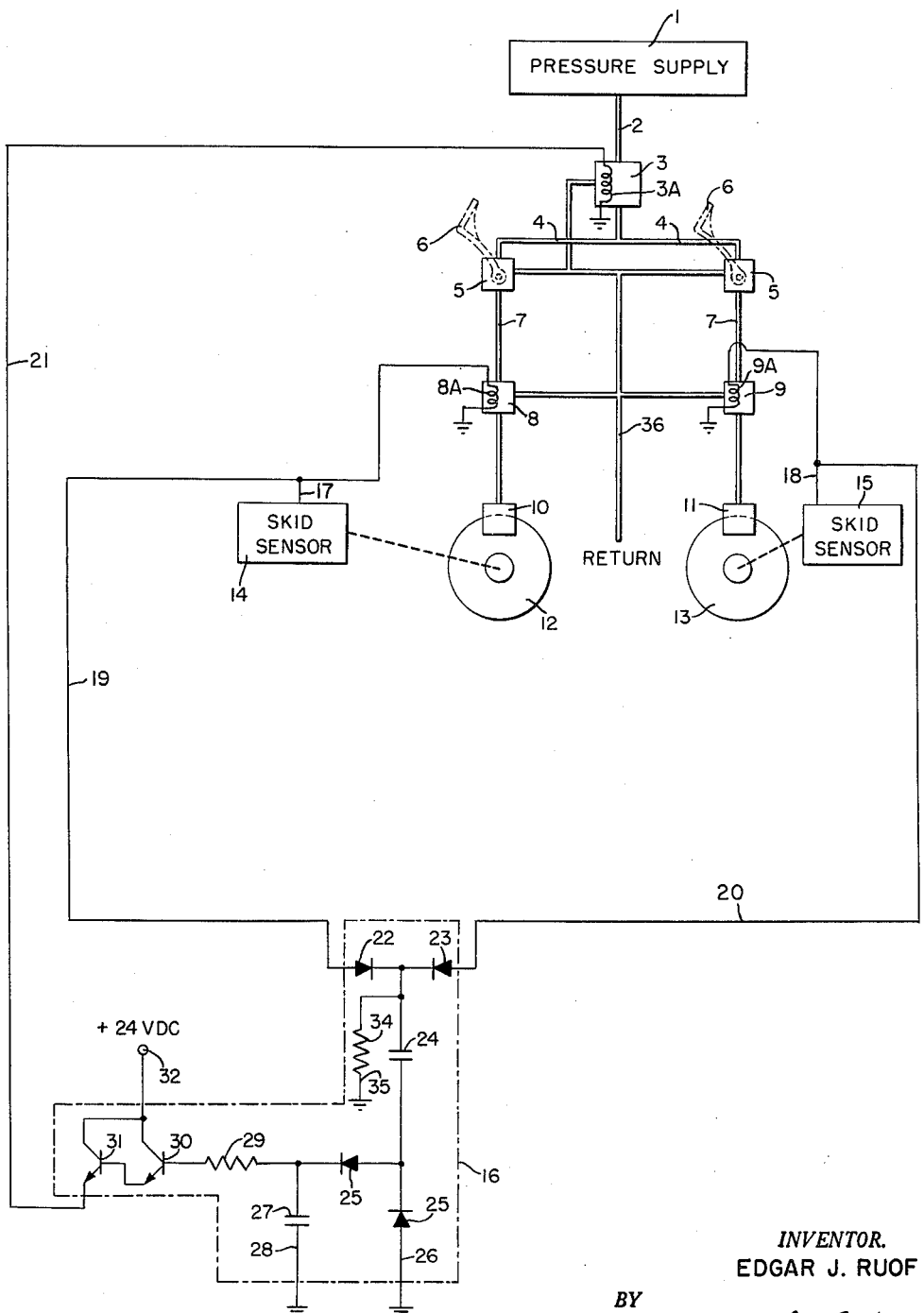

3,034,836
BRAKE PRESSURE CONTROL ANTI-SKID
APPARATUS
Edgar J. Ruof, Akron, Ohio, assignor to The Goodyear Tire & Rubber Company, Akron, Ohio, a corporation of Ohio
Filed Oct. 18, 1960, Ser. No. 63,440
4 Claims. (Cl. 303—21)

This invention relates to anti-skid apparatus for braked air-plane wheels and the like, and, more particularly, is concerned with apparatus of this type in which mechanism is provided for automatically and gradually reducing brake pressure each time the anti-skid apparatus applies and releases the brake pressure, the brake pressure being reduced to the point where wheel skidding no longer occurs.

It is the general object of the invention to provide relatively simple, inexpensive, long-lived, fully automatic apparatus for preventing or reducing the skidding of a braked wheel and wherein as the anti-skid mechanism cycles on and off the braking pressure is automatically reduced to the point where no further wheel skidding occurs, and with the braking pressure being increased automatically until the on-off brake pressure again results due to a wheel skid, so that a maximum braking effort is achieved.

Another object of the invention is the provision of an anti-skid braking combination in which there is less frequent cycling shorter stops, less severe strut bending in the case of an airplane, the braking pressure cannot be reduced by "pumping" the brakes, there are no orifices and no accumulators, and the system does not affect normal brake operation.

Another object of the invention is the provision of mechanism of the character described in which the available brake pressure is automatically reduced to a value slightly below that required to cause a skid, this being accomplished by causing successive reductions in available brake pressure with each successive skid cycle.

The foregoing objects of the invention, and other objects of the invention which will become apparent as the description proceeds, are achieved by the provision of the combination in an anti-skid brake control system for a wheel, of a fluid pressure supply, a conduit extending from the supply, a brake operating cylinder connected to the conduit, a skid sensing mechanism for generating an electric current when a skid develops at the wheel from overly applied brake pressure, a solenoid valve in the conduit near the cylinder for releasing the pressure on the brake cylinder when said electric current is generated, a brake operating valve under the control of the operator and positioned in the conduit between the solenoid valve and the pressure supply, a pressure adjusting valve positioned in the conduit between the pressure supply and the operating valve for adjusting the pressure of the fluid supplied to the conduit, means for adjusting said pressure adjusting valve to gradually decrease the fluid pressure supplied to the conduit each time the solenoid valve is operated, means for adjusting said pressure adjusting valve to gradually increase the fluid pressure supplied to the conduit when the solenoid valve is not operated, and conduit means for returning fluid to the supply when the pressure to the brake operating cylinder is cut off.

For a better understanding of the invention reference should be had to the accompanying drawings wherein the single FIGURE is a diagrammatic view of the apparatus of the invention as incorporated with a two-wheel braking system.

In the drawings, the numeral 1 indicates a supply of fluid under pressure connected by a conduit 2 to a pressure control valve 3 in turn connected by branch conduits 4 to operator-controlled valves 5. The valve 3 is of the known type wherein an electric solenoid 3A controls the amount of pressure applied, with the valve passing full pressure when no current is passed to the solenoid and with the pressure passed by the valve being gradually reduced as more voltage and resulting current flow is impressed on the solenoid. The operator controlled valves 5 are those normally controlled manually by the pilot of an airplane, for example, the control being effected by way of foot pedals 6 in known manner. The operator-controlled valves 5 are of the known type wherein the harder the pedals 6 are pushed, against spring resistance, the more pressure the valves pass. The valves 5 are connected by conduits 7 through solenoid valves 8 and 9 respectively to brake operating cylinders 10 and 11 engaging with the discs 12 and 13 carried by the wheels to be braked. The valves 8 and 9 are of the known type wherein with the valve normally open the application of a control voltage thereto effects the complete closure of the valve and the release of pressure from the cylinders 10 and 11 for return to the supply 1.

A skid sensor 14 is connected to the wheel disc 12 and a skid sensor 15 to the wheel disc 13 so that when a skid develops on the wheel associated with each disc an electric current will be generated by the skid sensor and will be passed, via electric leads 17 and 18, to the solenoid coils 8A and 9A controlling the operation of valves 8 and 9 respectively. The skid sensors 14 and 15 may be of the type disclosed in U. S. Patent No. 2,753,017

The control unit 16 is connected by an electric lead 19 to solenoid 8A of valve 8 and by electric lead 20 to solenoid 9A of valve 9, and by an electric lead 21 to solenoid 3A of pressure control valve 3.

The drawing also illustrates the electrical arrangement of the mechanism in the control unit 16, and shows specifically how the electrical leads 17 and 18 from the skid sensing means 14 and 15 extend, respectively, to the solenoid 8A of solenoid valve 8 and to the solenoid 9A of the solenoid valve 9. The electric leads 17 and 18 are likewise connected by way of leads 19 and 20 through diodes 22 and 23, for example of the IN649 type, through a condenser 24, for example of .2 mf. and to a pair of diodes 25, for example of the IN645 type, one of the diodes 25 being connected to ground 26, and the other to a condenser 27, for example of 1 mf. and to ground 28. Condenser 27 is connected through a resistance 29, for example of 2 megohmes to a pair of transistors 30 and 31 connected as shown, the transistor 30 being, for example, of the 2N336 type and transistor 31, for example, being of 2N656 type. A D. C. voltage of +24 volts direct current is applied to the circuit at 32, and electric lead 21 connects the output of transistor 31 to the solenoid coil 3A of pressure control valve 3, the other side of the solenoid coil 3A being connected to ground 33. Completing the circuit is a resistance 34, for example of 5,000 ohms, connected between ground 35 and condenser 24.

Now in the operation of the apparatus, each time a skid occurs at the wheel discs 12 and 13, the skid sensors 14 or 15 effects the application of an electric current in an amount sufficient to operate, respectively or collectively, the solenoid coil 9A of solenoid valve 9, and/or solenoid coil 8A of solenoid valve 8 to thereby close off the application of fluid pressure to the brake cylinders 10 and/or 11, the fluid therein being returned by conduit 36 to the supply 1 of fluid under pressure. More particularly, each time one or both of the solenoids 8A or 9A is energized, a certain amount of electric current flows into the condenser 27 to at least partially charge this condenser, and each successive anti-skid cycle, i.e. on and off operations of the solenoid valves 8 and/or 9, causes successive increases in the voltage of condenser 27.

As the charge on condenser 27 builds up, this charge is supplied through amplifying transistors 30 and 31 to energize solenoid coil 3A of pressure control valve 3 to gradually and progressively diminish the pressure of the fluid passing through the valve 3. This reduction in fluid pressure as effected by the pressure control valve 3 means that the pressure applied to the brake cylinders 10 and 11 is gradually reduced to the point where no further skids will occur on the wheels braked by the discs 12 and 13.

Stated in another manner, the electrical charge on the condenser 27 acts as a control voltage on the transistors 30 and 31 which control the passage of the 24 volts direct current applied at 32 to the solenoid 3A of pressure control valve 3. The greater the electrical charge upon the condenser 27 the more this charge opens transistors 30 and 31 to the passage of the control voltage applied at 32 and the greater is the degree of operation of solenoid 3A and the greater is the gradual but progressive reduction in the pressure of the fluid passsed by the pressure control valve 3 through the system to the brake operating cylinders 10 and 11.

Once the point is reached where the pressure passed to the brake cylinders 10 and 11 is no longer sufficient to cause a wheel skid, no further electrical charges are passed to the condenser 27 and the voltage thereon relatively slowly decays. This in turn causes the current flowing in solenoid 3A to relatively slowly decrease, which in turn causes the brake pressure to relatively slowly increase as passed by the pressure control valve 3. When the pressure increases enough to cause another skidding of the wheels braked by discs 12 and 13, the entire series of events as just described recur.

Actually the operation as just described as to the gradual decrease in the pressure of fluid passed by the pressure control valve 3 and the gradual increase in pressure of the fluid passed by the valve 3 is not as slow as might appear from the description. More specifically, in the single landing run of an airplane, the wheel brakes are normally applied almost immediately after touchdown of the wheels, and with an on and off cycling occurring at the solenoid valves 8 and 9 over a period of several seconds before the fluid pressure applied by the pressure control valve to the hydraulic system is reduced to the point where there is no skidding of the airplane wheels. Thereafter, it may take several seconds to build back up the pressure applied through the pressure control valve 3 to the point where the on and off cycling of brake pressure again recurs. And this series of events may recur from about 4 to about 20 or more times before the airplane is stopped. But by the use of the apparatus of the invention a shorter, quicker stop is achieved than if conventional anti-skid apparatus is utilized without any graduated control of pressure.

It will be recognized that in the operation of the system, it is necessary for the pilot to manually operate valves 5 in order to effect any braking operation so that it may be said that the manual control of the brakes is still part of the system of the invention.

The release of the manually controlled valves 5, i.e. the release of the brake pedals 6, causes the fluid under pressure in the brake cylinders 10 and 11 to be returned by a conduit 36 to the supply 1 of fluid pressure.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in an anti-skid brake control system for a wheel, of a fluid pressure supply, a conduit extending from the supply, a brake operating cylinder connected to the conduit, a skid sensing mechanism for producing an electric current when a skid develops at the wheel from overly applied brake pressure, a solenoid valve in the conduit near the cylinder for releasing the pressure on the brake cylinder when said electric current is produced, a brake operating valve under the control of the operator and positioned in the conduit between the solenoid valve and the pressure supply, a pressure adjusting valve positioned in the conduit between the pressure supply and the operating valve for adjusting the pressure of the fluid supplied to the conduit, means for adjusting said pressure adjusting valve to gradually decrease the fluid pressure supplied to the conduit each time the solenoid valve is operated and for adjusting said pressure adjusting valve to gradually increase the fluid pressure supplied to the conduit when the solenoid valve is not operated, and conduit means for returning fluid to the supply when the pressure to the brake operating cylinder is cut off.

2. The combination in an anti-skid brake control system for a wheel, of a fluid pressure supply, a conduit extending from the supply, a brake operating cylinder connected to the conduit, a skid sensing mechanism for producing an electric current when a skid develops at the wheel from overly applied brake pressure, a solenoid valve in the conduit for releasing the pressure on the brake cylinder when said electric current is produced, a brake operating valve under the control of the operator and positioned in the conduit between the solenoid valve and the pressure supply, a pressure adjusting valve positioned in the conduit between the pressure supply and the solenoid valve for adjusting the pressure of the fluid supplied to the conduit, means for adjusting said pressure adjusting valve to gradually decrease the fluid pressure supplied to the conduit each time the solenoid valve is operated and for adjusting said pressure adjusting valve to gradually increase the fluid pressure supplied to the conduit when the solenoid valve is not operated.

3. The combination in an anti-skid brake control system for a wheel, of a fluid pressure supply, a conduit extending from the supply, a brake operating cylinder connected to the conduit, a skid sensing mechanism for supplying an electric current when a skid develops at the wheel from overly applied brake pressure, a solenoid valve in the conduit for releasing the pressure on the brake cylinder when said electric current is supplied, a brake operating valve under the control of the operator and positioned in the conduit between the solenoid valve and the pressure supply, a pressure adjusting valve positioned in the conduit between the pressure supply and the solenoid valve for adjusting the pressure of the fluid supplied to the conduit, electric means for adjusting said pressure adjusting valve, said electric means including an electric current supply adapted to be applied to the pressure adjusting valve to reduce the pressure passed thereby, a condenser charged by each on-off cycle of the skid sensing mechanism, electric current valving means controlled by the charge on the condenser for controlling the amount of electric current passing to the pressure adjusting valve from the electric current supply, and a resistor to ground connection for gradually reducing the charge on the condenser when the on-off cycling of the skid sensing mechanism is stopped.

4. The combination in an anti-skid brake control system for a wheel, of a fluid pressure supply, a conduit extending from the supply, a brake operating cylinder connected to the conduit, a skid sensing mechanism for effecting the supply of an electric current when a skid develops at the wheel from overly applied brake pressure, a solenoid valve in the conduit near the cylinder for releasing the pressure on the brake cylinder when said electric current is supplied, a brake operating valve under the control of the operator and positioned in the conduit between the solenoid valve and the pressure supply, a pressure adjusting valve positioned in the conduit between the pressure supply and the solenoid valve for adjusting the pressure of the fluid supplied to the conduit, means for adjusting said pressure adjusting valve to gradually decrease the fluid pressure supplied to the conduit each time the solenoid valve is operated, said means including an electric current supply adapted to be applied to the pressure adjusting valve to reduce the pressure passed thereby, a condenser charged by each on-off cycle of the skid sensing mechanism, and electric current valving means controlled by the charge on the condenser for controlling the amount of electric current passing to the pressure adjusting valve from the electric current supply.

References Cited in the file of this patent

UNITED STATES PATENTS 2,957,659     Yarber _____ Oct. 25, 1960